US012664711B2

(12) United States Patent
Kim et al.

(10) Patent No.: US 12,664,711 B2
(45) Date of Patent: Jun. 23, 2026

(54) GENERATION METHOD FOR A STEERABLE REALISTIC IMAGE CONTENTS AND MOTION SIMULATION SYSTEM THEREOF

(71) Applicant: KOREA INSTITUTE OF SCIENCE AND TECHNOLOGY, Seoul (KR)

(72) Inventors: Jinwook Kim, Seoul (KR); Kyung-Ryoul Mun, Seoul (KR); Seong Geun Yoo, Seoul (KR); Seong Jong Yoo, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 239 days.

(21) Appl. No.: 18/087,109

(22) Filed: Dec. 22, 2022

(65) Prior Publication Data

US 2023/0206529 A1 Jun. 29, 2023

(30) Foreign Application Priority Data

Dec. 23, 2021 (KR) ........................ 10-2021-0186213

(51) Int. Cl.
*G06T 13/20* (2011.01)
*G06T 7/246* (2017.01)
*G06T 19/00* (2011.01)
(52) U.S. Cl.
CPC .............. *G06T 13/20* (2013.01); *G06T 7/248* (2017.01); *G06T 19/006* (2013.01); *G06T 2200/08* (2013.01); *G06T 2200/24* (2013.01)
(58) Field of Classification Search
CPC ....... G06T 13/20; G06T 7/248; G06T 19/006; G06T 2200/08; G06T 2200/24;
(Continued)

(56) References Cited

U.S. PATENT DOCUMENTS 12,071,156 B2 * 8/2024 Buchanan .............. G05D 1/249
2005/0195128 A1 * 9/2005 Sefton ................ A63B 71/0622
                                                  348/E13.059
(Continued)

FOREIGN PATENT DOCUMENTS

JP      2020008664 A  *  1/2020
KR  10-2010-0047563 A     5/2010
(Continued)

OTHER PUBLICATIONS

Ingwer, Patrick, et al. "Practical usefulness of structure from motion (SfM) point clouds obtained from different consumer cameras." *Mobile Devices and Multimedia: Enabling Technologies, Algorithms, and Applications 2015*. vol. 9411. SPIE, Jun. 10, 2015. pp. 1-11.
(Continued)

*Primary Examiner* — Kent W Chang
*Assistant Examiner* — Karl Duc Truong
(74) *Attorney, Agent, or Firm* — NSIP Law

(57) ABSTRACT

Provided are a method for generating steerable realistic image content according to an embodiment and a motion simulation system thereof. A device for generating steerable realistic image content according to an embodiment includes at least one processor and a memory configured to store at least one program which is executed by the at least one processor, wherein the processor is configured to acquire a motion path in a realistic image captured by a camera while the camera is moving along a predetermined path, generate a 3-dimensional (3D) motion model based on the motion path, and synchronize the 3D motion model with the realistic image, and the 3D motion model includes a 3D moving object which moves along a 3D motion path generated along 3D coordinates of the motion path.

12 Claims, 13 Drawing Sheets

(58) Field of Classification Search
CPC ......... G06T 7/246; G06T 17/00; G06T 19/20; G06Q 50/10; G09B 9/301; H04N 13/282; H04N 13/398
See application file for complete search history.

(56) References Cited

U.S. PATENT DOCUMENTS

| | | | | |
|---|---|---|---|---|
| 2010/0232770 | A1* | 9/2010 | Prestenback | H04N 21/4325 386/E5.042 |
| 2011/0181711 | A1* | 7/2011 | Reid | G06T 19/003 348/121 |
| 2014/0333729 | A1* | 11/2014 | Pflug | G06T 15/50 348/47 |
| 2016/0379415 | A1* | 12/2016 | Espeset | G11B 27/031 345/633 |
| 2019/0220089 | A1* | 7/2019 | Kakizawa | A63F 13/807 |
| 2020/0128902 | A1* | 4/2020 | Brown | A42B 3/30 |
| 2020/0213575 | A1* | 7/2020 | Shibagami | H04N 13/398 |
| 2020/0269122 | A1* | 8/2020 | Zitvogel | A63F 13/803 |
| 2020/0388068 | A1* | 12/2020 | Yeung | G06N 20/00 |
| 2021/0016793 | A1* | 1/2021 | Yamaguchi | G08G 1/096861 |
| 2021/0312719 | A1* | 10/2021 | Holzer | H04N 13/156 |
| 2022/0080284 | A1* | 3/2022 | Churchman | A63B 22/0242 |
| 2022/0204019 | A1* | 6/2022 | Lauterbach | G06T 15/205 |
| 2022/0254108 | A1* | 8/2022 | Cower | G06T 7/33 |

FOREIGN PATENT DOCUMENTS

| | | |
|---|---|---|
| KR | 10-1223040 B1 | 1/2013 |
| KR | 10-1748401 B1 | 6/2017 |
| KR | 10-2017-0123328 A | 11/2017 |
| KR | 10-1865173 B1 | 6/2018 |
| KR | 10-1965732 B1 | 4/2019 |
| KR | 10-2021-0108044 A | 9/2021 |
| KR | 10-2345295 B1 | 12/2021 |
| KR | 10-2348778 B1 | 1/2022 |
| WO | WO 2016/191467 A1 | 12/2016 |

OTHER PUBLICATIONS

Vijayanarasimhan, Sudheendra, et al. "Sim-net: Learning of structure and motion from video." *arXiv preprint arXiv:1704.07804.* Apr. 25, 2017. pp. 1-9.

* cited by examiner

100

Motion path generation unit — 101

3D motion model generation unit — 102

Content synchronization unit — 103

Realistic image generation unit — 104

Realistic image          3D motion path

First-person view image

GENERATION METHOD FOR A STEERABLE REALISTIC IMAGE CONTENTS AND MOTION SIMULATION SYSTEM THEREOF

CROSS-REFERENCE TO RELATED APPLICATIONS

This application claims priority to Korean Patent Application No. 10-2021-0186213, filed on Dec. 23, 2021, and all the benefits accruing therefrom under 35 U.S.C. § 119, the contents of which in its entirety are herein incorporated by reference.

BACKGROUND

1. Field

The present disclosure relates to a method for generating a steerable realistic image and a motion simulation system thereof, and more particularly, to a method for generating a realistic image including a steerable 3-dimensional object and a simulation system of the realistic image.

2. Description of the Related Art

Content creation for motion simulators is made using a realistic image based method or a computer graphics based method.

According to the realistic image based method, content to be provided through a motion simulator is actually created. A fixed first-person view (FPV) image or a 360-degree image is used to create the content, and the created content is provided through the motion simulator. The realistic image based method requires a low cost and is easy and convenient to implement since it creates content by single imaging, but experts need to manually reproduce movements of motions based on fixed view images, and the motion simulator operates by playing at the fixed speed and view, so it cannot be applied to racing simulators or bobsleigh simulators that need to be steered.

According to the computer graphics based method, an object and an environment are modeled in three dimensions (3D), followed by texture mapping, lighting and rendering to make content look real, and the created content is provided through a motion simulator. The computer graphics based method achieves precise simulation in combination with a physics engine, but requires a lot of time, cost and labor required to create images that are close to real images.

To overcome the intrinsic disadvantages of the two methods, the applicant developed a method for generating a realistic image including a steerable 3D object and a simulation system of the realistic image.

SUMMARY

The present disclosure is designed to solve the above-described problem, and specifically, the present disclosure is directed to providing a method for generating a steerable realistic image and a motion simulation system thereof, and more particularly, a method for generating a realistic image including a steerable 3-dimensional (3D) object and a simulation system of the realistic image.

A device for generating steerable realistic image content according to an embodiment includes at least one processor and a memory configured to store at least one program which is executed by the at least one processor, wherein the processor is configured to acquire a motion path in a realistic image captured by a camera while the camera is moving along a predetermined path, generate a 3D motion model based on the motion path, and synchronize the 3D motion model with the realistic image, and the 3D motion model includes a 3D moving object which moves along a 3D motion path generated along 3D coordinates of the motion path.

The realistic image may include a plurality of images generated frame by frame, a reference point corresponding to the moving object to be modeled in 3D may be defined for each of the plurality of images, and the motion path may be generated by arranging the plurality of images on a 3D space in a playing order, and tracking a change in 3D coordinates of the reference point found on the plurality of arranged images.

The processor may be configured to synchronize at least a movement speed of the 3D moving object with a playing speed of the realistic image.

The camera may be a 360-degree camera, and the realistic image may be a 360-degree image.

The processor may be further configured to convert a first-person view (FPV) image transmitted from the camera to the realistic image, and the realistic image may be a 180-degree image.

The realistic image may be defined as a focused region and a surrounding region outside of the focused region, and the processor may be further configured to carry out blurring to make the surrounding region blurry than the focused region.

A motion simulation system of steerable realistic image content according to an embodiment includes a device for generating realistic image content to generate the steerable realistic image content and a device for providing a realistic image to provide the steerable realistic image content to a first user, wherein the device for generating realistic image content includes at least one first processor and a first memory to store at least one program which is executed by the at least one first processor, the first processor is configured to acquire a motion path in a realistic image captured by a camera while the camera is moving along a predetermined path, generate a 3D motion model based on the motion path, and synchronize the 3D motion model with the realistic image to generate synchronization information, the 3D motion model includes a 3D moving object which moves a 3D motion path generated along 3D coordinates of the motion path, the steerable realistic image content includes the realistic image, the 3D motion model and the synchronization information, and the device for providing a realistic image includes at least one second processor and a second memory to store at least one program which is executed by the at least one second processor, wherein the second processor is configured to input the first user's steering command, at least one third processor and a third memory to store at least one program which is executed by the at least one third processor, wherein the third processor is configured to output the steerable realistic image content to the first user, at least one fourth processor and a fourth memory to store at least one program which is executed by the at least one fourth processor, wherein the fourth processor is configured to transmit a motion change in the steerable realistic image content to the first user, and a fifth processor configured to control the second processor, the third processor and the fourth processor.

The fifth processor may be configured to provide the realistic image to the first user through the third processor, and provide the steerable realistic image content to the first user by simulating the 3D motion model corresponding to the realistic image with reference to the synchronization information.

The fifth processor may be configured to perform processing to reflect the first user's input provided by the second processor on the steerable realistic image content in real time.

When the first user changes a speed of the 3D moving object through the second processor, the fifth processor may be configured to simulate the 3D moving object to match the changed speed, change the playing speed of the realistic image in sync and provide to the first user.

The first processor may be further configured to convert a FPV image transmitted from the camera to the realistic image, and the realistic image may be a 180-degree image.

The realistic image may be defined as a focused region and a surrounding region outside of the focused region, and the fifth processor may be further configured to receive information associated with a change in head direction of the first user from the third processor, define the focused region and the surrounding region in real time based on the received information associated with the change in head direction and blur the defined surrounding region.

A method performed by a device for generating steerable realistic image content according to an embodiment is a method performed by the device for generating steerable realistic image content including at least one processor and a memory for storing a program which is executed by the processor, and includes acquiring a motion path in a realistic image captured by a camera while the camera is moving along a predetermined path, generating a 3D motion model based on the motion path, wherein the 3D motion model includes a 3D moving object which moves along a 3D motion path generated along 3D coordinates of the motion path, and synchronizing the 3D motion model with the realistic image.

The realistic image may include a plurality of images generated frame by frame, a reference point corresponding to the moving object to be modeled in 3D may be defined for each of the plurality of images, and the motion path may be generated by arranging the plurality of images on a 3D space in a playing order, and tracking a change in 3D coordinates of the reference point found on the plurality of arranged images.

The step of synchronizing the 3D motion model with the realistic image may include synchronizing at least a movement speed of the 3D moving object with a playing speed of the realistic image.

The camera may be a 360-degree camera, and the realistic image may be a 360-degree image.

The method may further include generating the realistic image by converting a FPV image transmitted from the camera to the realistic image, and the realistic image may be a 180-degree image.

The step of generating the realistic image by converting the FPV image transmitted from the camera to the realistic image may further include defining the realistic image as a focused region and a surrounding region outside of the focused region, and carrying out blurring to make the surrounding region more blurry than the focused region.

A computer program according to an embodiment of the present disclosure may be stored in a non-transitory computer-readable medium for storing a program which is executed to perform the method for generating steerable realistic image content.

The method for generating steerable realistic image content according to an embodiment of the present disclosure can generate motion simulator content including a steerable object with significantly reduced time, cost and labor compared to the computer graphics based method.

That is, the method for generating steerable realistic image content according to an embodiment of the present disclosure and the motion simulation system thereof can steer a moving object in content that was impossible in the content of the existing realistic image based method, thereby providing a user with more realistic motion simulator based content.

Additionally, the method for generating steerable realistic image content according to an embodiment of the present disclosure and the motion simulation system thereof can create steerable motion simulation content at a lower cost in a straightforward manner, thereby improving the support of virtual training in the sectors requiring high training costs (for example, aviation, heavy equipment driving, winter sports).

DETAILED DESCRIPTION

Hereinafter, an exemplary embodiment of the present disclosure will be described in detail with reference to the accompanying drawings. The detailed description that will be disclosed below with the accompanying drawings is provided to describe an exemplary embodiment of the present disclosure, but is not intended to present only an embodiment in which the present disclosure can be practiced. The following detailed description includes the details to provide a thorough understanding of the present disclosure. However, those skilled in the art will understand that the present disclosure may be practiced without the detailed description. The certain terms as used herein are provided to help understanding of the present disclosure, and the use of the terms may be modified in any other form without departing from the technical spirit of the present disclosure.

Figure 1:
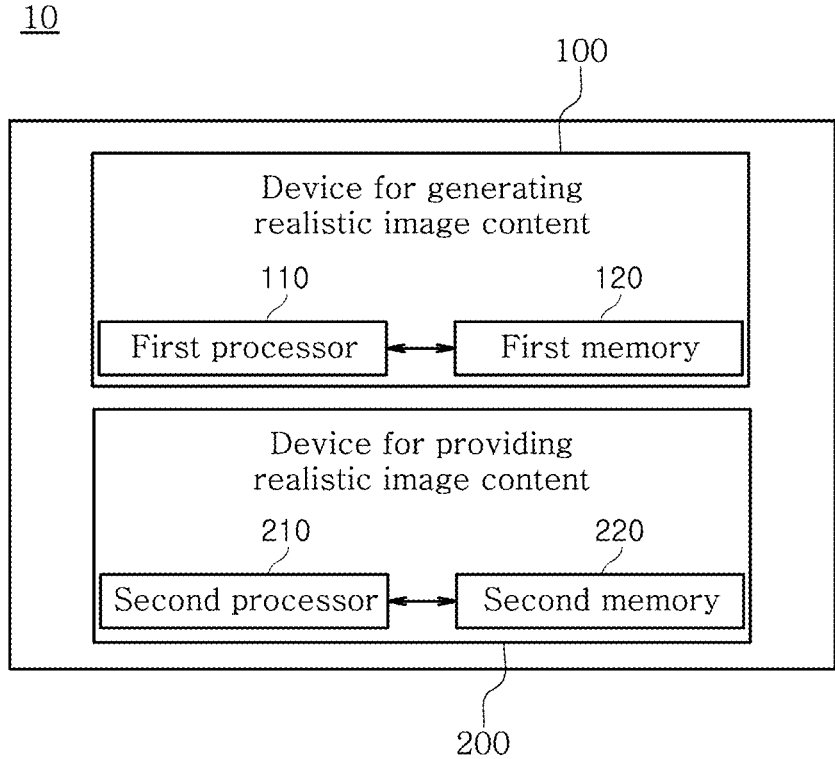
FIG. 1 shows the architecture of a motion simulation system of steerable realistic image content according to an embodiment of the present disclosure.
Figure 2:
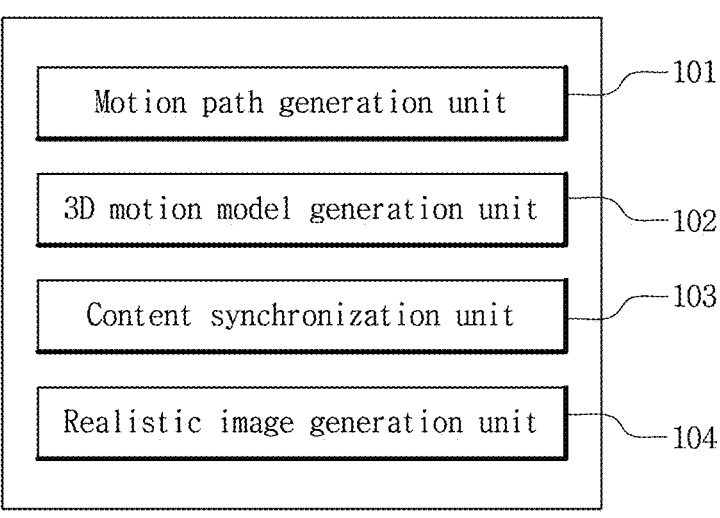
FIG. 2 is a block diagram showing the configuration of a device for generating realistic image content.
Figure 3:
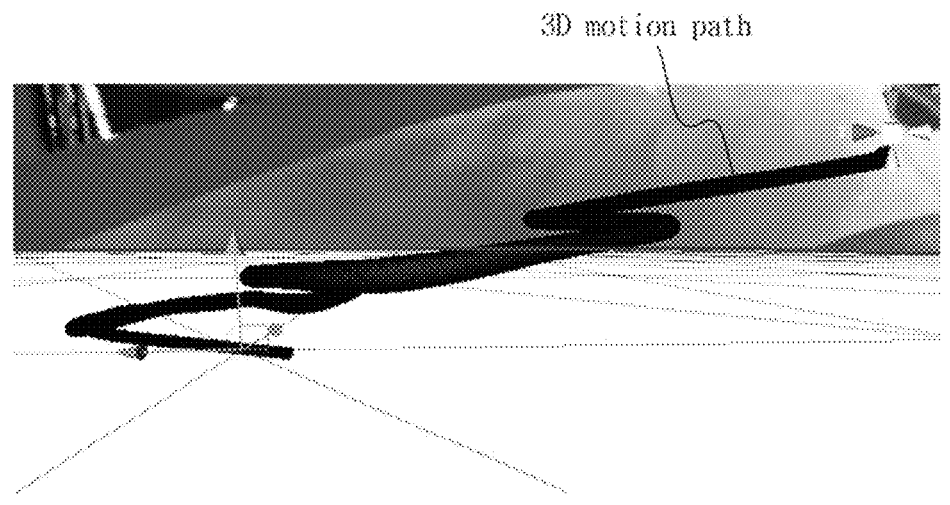
FIG. 3 is an exemplary diagram showing a 3-dimensional (3D) motion path.
Figure 4:
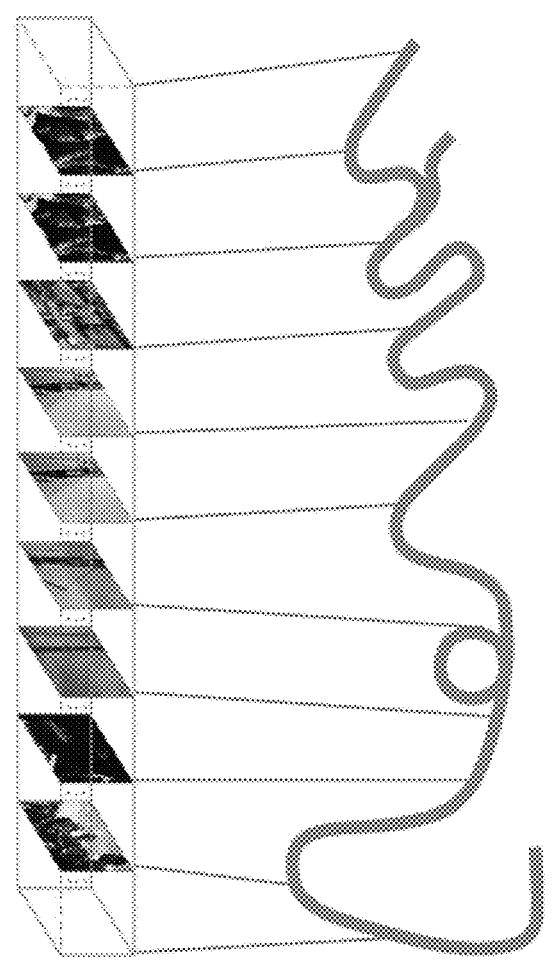
FIG. 4 is an exemplary image of realistic image synchronization with a 3D motion generation model.
Figure 5:
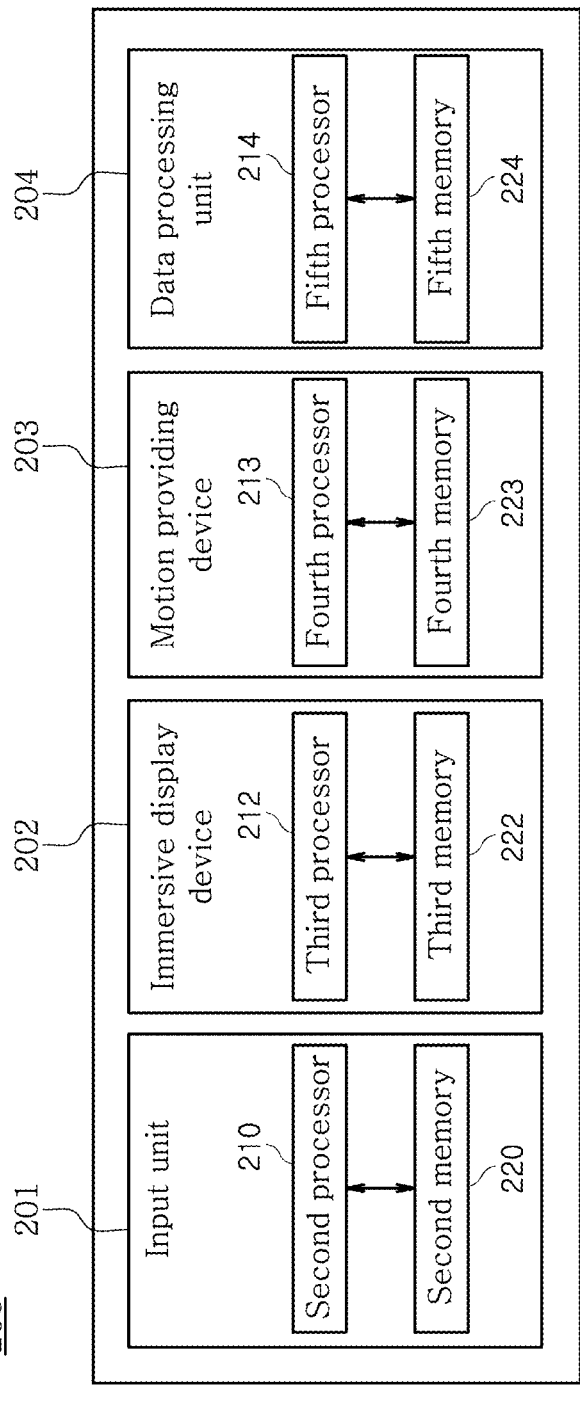
FIG. 5 is a block diagram showing the configuration of a device for providing realistic image content.
Figure 6:
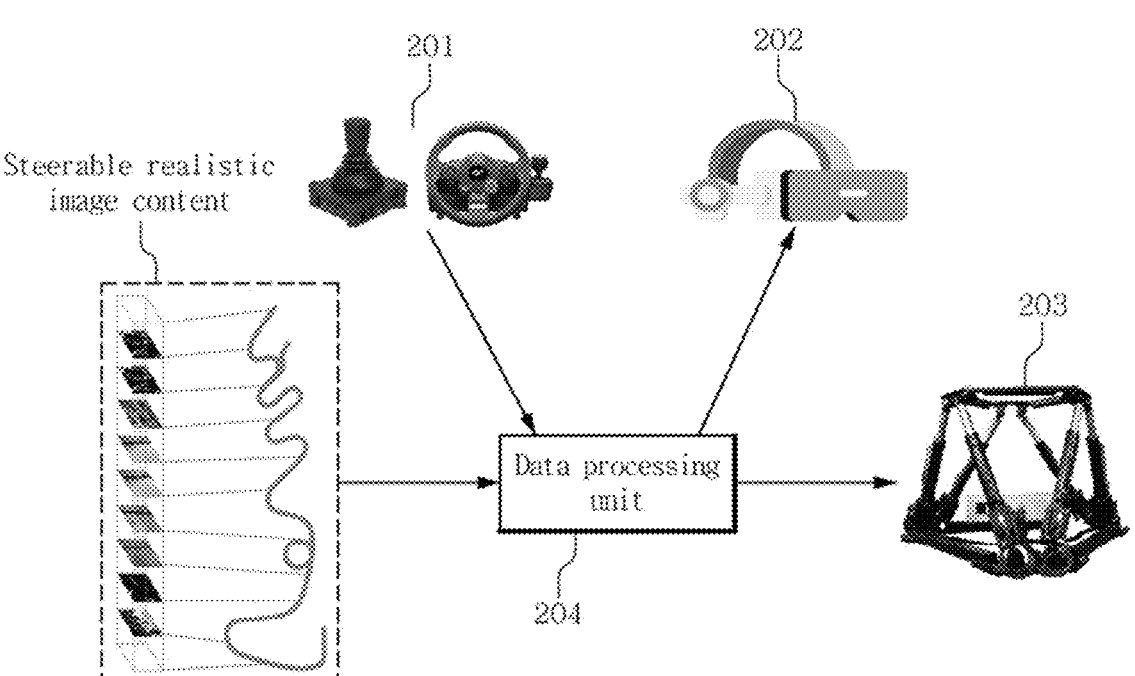
FIG. 6 shows exemplarily the configuration of a device for providing realistic image content.
Figure 7:
FIG. 7 is an exemplary diagram of a first-person view (FPV) image.
Figure 8:
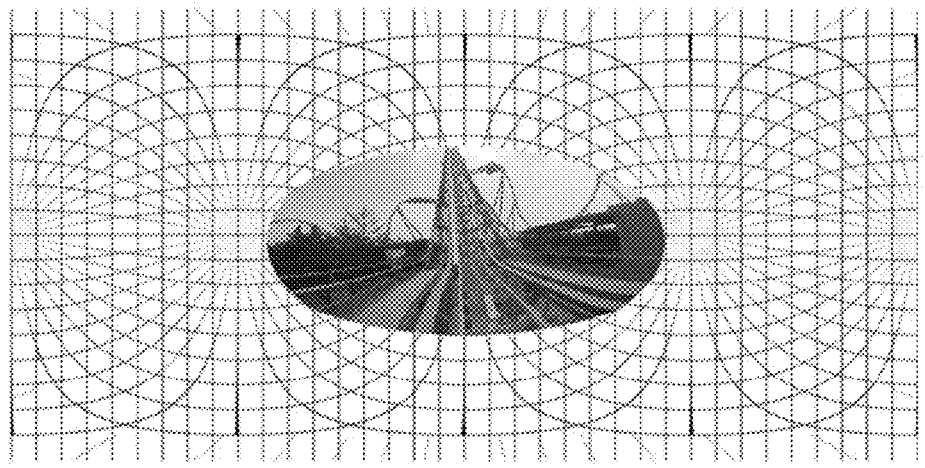
FIG. 8 is an exemplary diagram showing the projection of the image of FIG. 7 into an equirectangular image format.
Figure 9:
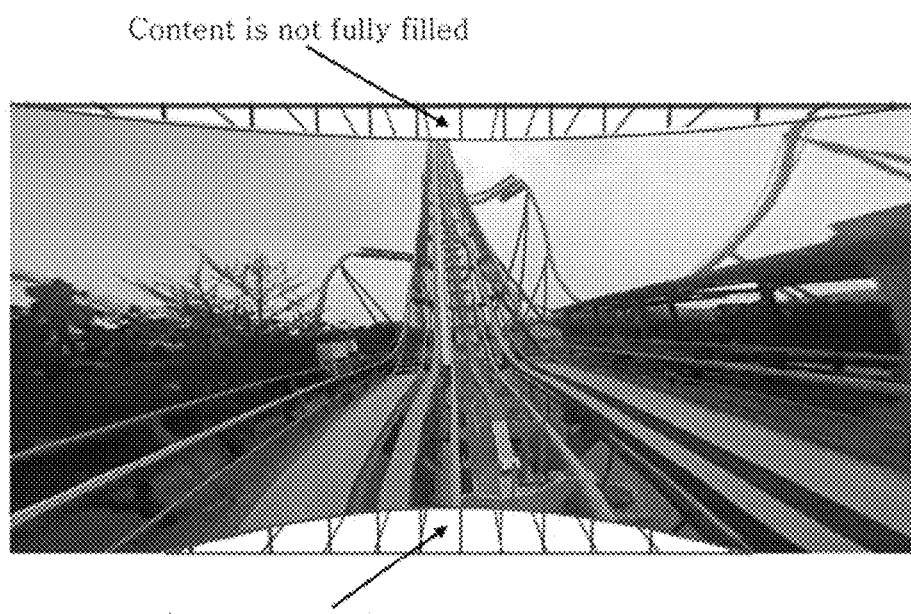
FIG. 9 is an exemplary image showing the playback of FIG. 8 converted into a realistic image format.
Figure 10:
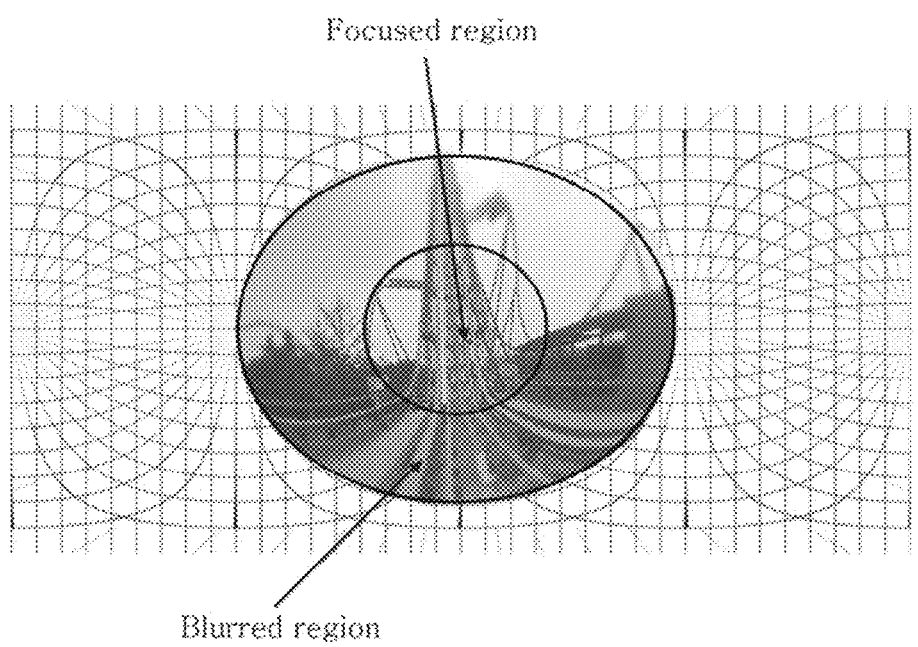
FIG. 10 is an exemplary diagram showing the conversion of a FPV image to a 180-degree image and projection into an equirectangular image format.
Figure 11:
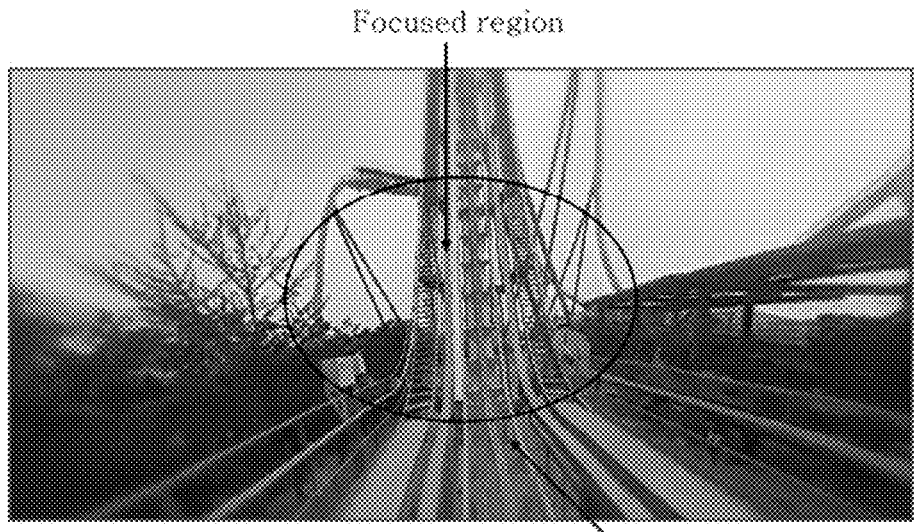
FIG. 11 is an exemplary image showing the playback of FIG. 10 converted into a realistic image format.
Figure 12:
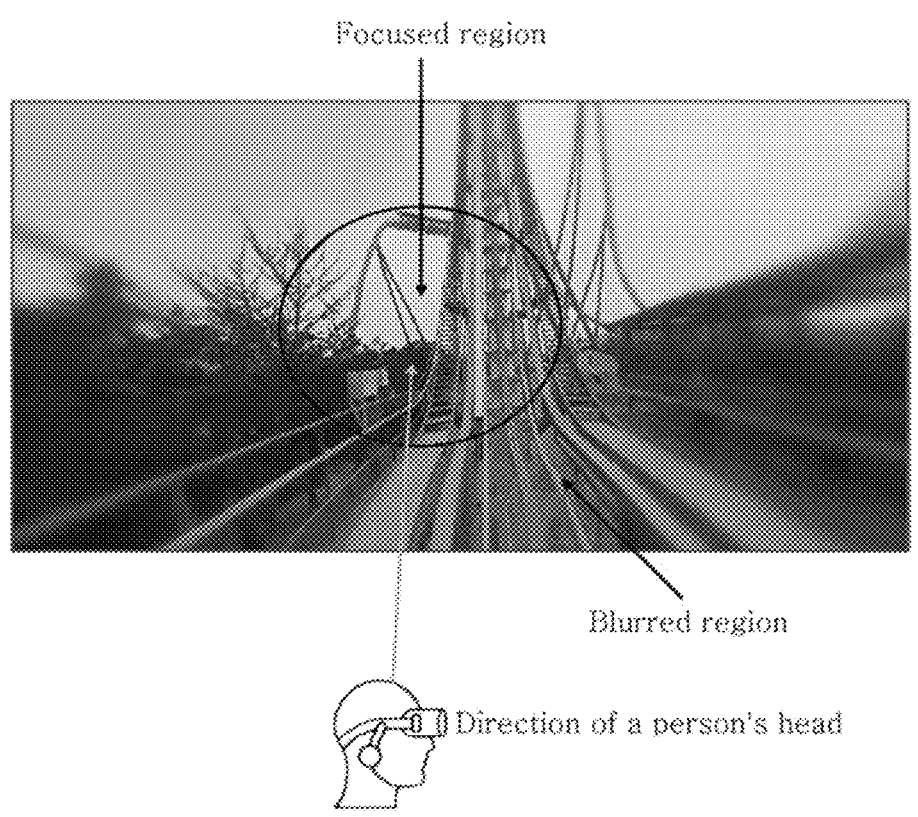
FIG. 12 shows an example of changing a focused region through head tracking.

FIG. 1 shows the architecture of a motion simulation system of steerable realistic image content according to an embodiment of the present disclosure. FIG. 2 is a block diagram showing the configuration of a device for generating realistic image content. FIG. 3 is an exemplary diagram showing a 3-dimensional (3D) motion path. FIG. 4 is an exemplary image of realistic image synchronization with a 3D motion generation model. FIG. 5 is a block diagram showing the configuration of a device for providing realistic image content. FIG. 6 shows exemplarily the configuration of the device for providing realistic image content. FIG. 7 is an exemplary diagram of a first-person view (FPV) image. FIG. 8 is an exemplary diagram showing the projection of the image of FIG. 7 into an equirectangular image format. FIG. 9 is an exemplary image showing the playback of FIG. 8 converted into a realistic image format. FIG. 10 is an exemplary diagram showing the conversion of a FPV image to a 180-degree image and projection into an equirectangular image format. FIG. 11 is an exemplary image showing the playback of FIG. 10 converted into a realistic image format. FIG. 12 shows an example of changing a focused region through head tracking.

Referring to FIG. 1, the motion simulation system 10 of steerable realistic image content includes a device 100 for generating realistic image content and a device 200 for providing realistic image content.

The device 100 for generating realistic image content may generate steerable realistic image content including a combination of a realistic image and a steerable 3D moving object. The device 200 for providing realistic image content may provide a first user with the steerable realistic image content generated by the device 100 for generating realistic image content. Here, the first user refers to a user who experiences the steerable realistic image content through the device 200 for providing realistic image content. The steerable realistic image content is in a state in which the realistic image and movements of the steerable the 3D moving object are in sync. The user of the device 200 for providing realistic image content may input the first user's command to steer the 3D moving object, and the realistic image is affected together with the 3D moving object that changes in response to the first user's command.

Referring to FIG. 2, the device 100 for generating realistic image content includes a motion path generation unit 101, a 3D motion model generation unit 102 and a content synchronization unit 103.

Each unit of the device 100 for generating realistic image content is not necessarily intended to indicate a respective component that is physically different from each other. Although FIG. 2 shows the motion path generation unit 101, the 3D motion model generation unit 102 and the content synchronization unit 103 as respective blocks that are different from each other, this is merely the functional division of the components of the device for generating realistic image content by the operations performed by the corresponding components. Accordingly, according to embodiments, some or all of the motion path generation unit 101, the 3D motion model generation unit 102 and the content synchronization unit 103 may be integrated into a same device and may be implemented as respective devices, at least one of which is physically different from the other unit, and may be the components connected to communicate with each other in a distributed computing environment.

In other words, the motion path generation unit 101, the 3D motion model generation unit 102 and the content synchronization unit 103 may be implemented using at least one device that is physically different from each other or may be implemented by at least one processor or a combination of at least one processor and software, and as opposed to the illustrated example, their operations may not be distinctly different from each other. The motion path generation unit 101 may acquire a motion path in a realistic image. The realistic image may be provided from an external device (for example, a camera) that can communicate with the device 100 for generating realistic image content. The realistic image corresponds to an image of a real situation to provide a sense of immersion to the first user. In this embodiment, the realistic image may be an image captured by the camera while the camera is moving along a predetermined path. That is, when the first user experiences the realistic image through an immersive display device (for example, a head-up display), the first user may have immersive experience as if the first use were moving along the predetermined path. For example, the realistic image may be an image captured by the camera while the camera is moving along a bobsleigh course, and the first user may have immersive experience as if the first user were playing a bobsleigh game through the realistic image.

The realistic image includes a plurality of images generated frame by frame. The motion path generation unit 101 may define a reference point corresponding to the moving object to be modelled in 3D for each of the plurality of images, and acquire a motion path based on the reference point. The motion path may be generated by arranging the plurality of images that constitutes the realistic image on a 3D space in the playing order, and tracking a change in 3D coordinates of the reference point found on the plurality of arranged images. For example, the motion path generation unit 101 may extract the motion path from the realistic image using technology such as Visual Simultaneous Localization And Mapping (SLAM). Additionally, the motion path generation unit 101 may generate the motion path, further considering location information of a location at which the realistic image is captured. That is, the location information such as geographic information system (GIS) information of the location at which the realistic image is captured may be further input to the motion path generation unit 101, and the motion path generation unit 101 may generate the motion path further reflecting the GIS information. For example, when the location at which the realistic image is captured is the bobsleigh track, the motion path further reflecting the GIS information of the bobsled course may be generated.

The motion path generated by the motion path generation unit 101 may be an array of 3D coordinates of the location of the reference point that changes as the realistic image is played, and the motion path of the 3D virtual model that is simulated in the steerable realistic image may be generated based on the motion path. The motion path generation unit 101 may provide the generated motion path to the 3D motion model generation unit 102.

The 3D motion model generation unit 102 may generate a 3D motion model based on the motion path. The 3D motion model includes a 3D motion path generated along the 3D coordinates of the motion path, and a 3D moving object that moves along the 3D motion path. The 3D moving object may be physically simulated, and may be a model that is similar to real.

Specifically, the 3D motion model generation unit 102 may generate the 3D motion path based on the 3D coordinates of the motion path. The 3D motion path may be formed by the movement of a cylindrical basic model (for example, a cylindrical model) along the 3D coordinates of the input motion path in a sequential order. After the 3D motion path and the basic model are formed, the 3D moving object may be generated by visual rendering of the basic model. That is, the visual rendering may be carried out to look similar to the real object moving along the predetermined path in the realistic image. Additionally, a physics engine may be applied to give the physical effect to the 3D moving object, and the first user's input, a physical change by manipulation or interaction with another object may be applied to the 3D moving object.

The process of generating the 3D motion model performed by the 3D motion model generation unit 102 may, in part, be performed according to a second user's command. Here, the second user may be a subject that creates the steerable realistic image content, and refers to a user who uses the device 100 for generating realistic image content. The 3D motion model generation unit 102 may generate the 3D motion model in response to the second user's command provided from an input unit (not shown). The 3D motion model generation unit 102 may provide the second user with at least one of a user interface that receives the second user's command for forming the 3D motion path and the basic model and its related program, a user interface that receives the second user's command for carrying out the visual rendering and its related program or a user interface that receives the second user's command for applying the physics engine and its related program. In an embodiment, the 3D motion path and the basic model may be formed by an automated program, but the visual rendering and the physics engine may be applied according to the second user's command.

The 3D moving object may be generated reflecting the features of the real object moving in the realistic image. For example, when the predetermined course of the realistic image is the bobsleigh course, the 3D moving object may be modeled as a bobsleigh sled in 3D. Additionally, the movement may be modeled reflecting the physical features applied to the bobsled as the 3D moving object moves along the predetermined course. The 3D motion model generated by the 3D motion model generation unit 102 may be modeled reflecting not only the shape of the real object of the realistic image but also the motion characteristics of the real object. Additionally, in the 3D motion model, the 3D moving object reflecting the physics engine may have at least a change in speed. Here, the change in speed may refer to the speed at which the 3D moving object moves along the 3D motion path. Additionally, the 3D moving object may have a change in direction. However, since the change in direction in this embodiment needs to match the real image that will be displayed together, the change in direction of the 3D moving object may be limited to the range of the real image.

The content synchronization unit 103 may synchronize the generated 3D motion model with the realistic image to generate synchronization information. Here, the synchronization refers to matching the movement change of the 3D moving object in the 3D motion model with the image change in the realistic image. The image of the realistic image and the movement of the 3D moving object may be matched to each other to output the 3D moving object in sync with the realistic image that will be provided to the first user. Referring to FIG. 4, it can be seen that in the 3D motion model, the matching between the movement of the moving object and the plurality of images that constitutes the realistic image is performed for each frame of the plurality of images. However, the present disclosure is not limited thereto, and the realistic image may include a plurality of key frames defined at a predetermined interval between a start frame and an end frame, and the matching may be performed with respect to the key frames.

As the movement of the 3D moving object of the 3D motion model and each image of the realistic image are synchronized with each other, at least the movement speed of the 3D moving object and the playing speed of the realistic image may be synchronized with each other. When the playing speed of the realistic image increases, the movement speed of the 3D moving object displayed together may increase. Additionally, when the movement speed of the 3D moving object is increased by the first user's manipulation, the playing speed of the realistic image in sync may also increase.

The synchronization performed by the content synchronization unit 103 may include determining a location at which the 3D motion model displayed with the realistic image is displayed on the display. In an example, the location at which the 3D motion model is displayed may correspond to the reference point of the realistic image. The synchronization information including the location information may be generated.

The device 100 for generating realistic image content may generate steerable realistic image content including the realistic image, the 3D motion model and the synchronization information, and provide the generated steerable realistic image content to the device 200 for providing realistic image content.

The device 200 for providing realistic image content may provide the first user with the steerable realistic image content generated by the device 100 for generating realistic image content.

Referring to FIGS. 5 and 6, the device 200 for providing realistic image content includes an input unit 201, an immersive display device 202, a motion providing device 203 and a data processing unit 204.

The input unit 201, the immersive display device 202, the motion providing device 203 and the data processing unit 204 may be implemented using at least one device that is physically different from each other or may be implemented by at least one processor or a combination of at least one processor and software, and as opposed to the illustrated example, their operations may not be distinctly different from each other. The input unit 201 may be configured for the input of the first user's steering command. The first user's steering command is used to steer the 3D moving object included in the steerable realistic image content, and may change at least one of the speed or direction of the 3D moving object. As shown in FIG. 6, the input unit 201 may be in the form of a joystick or a handle, but is not limited thereto.

The immersive display device 202 may provide the steerable realistic image content to the first user. The immersive display device 202 may display and provide the realistic image and the 3D motion model in sync with the realistic image together to the first user. The immersive display device 202 may be a head-up display device as shown in FIG. 6, but is not limited thereto.

The motion providing device 203 may transmit a motion change in the steerable realistic image content to the first user. The motion providing device 203 may be configured to transmit the realistic motion change to the first user who experiences first steerable realistic image content when the first user touches with at least part of his/her body. As shown in FIG. 6, the motion providing device 203 may include a multi-axis motion simulator to provide the first user with the motion corresponding to the coordinates of the 3D motion model. However, the motion providing device 203 is not limited thereto.

The data processing unit 204 is configured to control the input unit 201, the immersive display device 202 and the motion providing device 203. The data processing unit 204 may control the output of the steerable realistic image content from the immersive display device 202. Specifically, the data processing unit 204 may provide the realistic image to the first user through the immersive display device 202, and may provide the steerable realistic image content to the first user by simulating the 3D motion model corresponding to the realistic image with reference to the synchronization information. Additionally, the data processing unit 204 may be configured to analyze the current coordinates of the 3D motion model in real time and provide the same to the motion providing device 203. Additionally, the data processing unit 204 may perform processing to reflect the first user's input provided by the input unit 201 on the steerable realistic image content in real time. Here, the first user's input may include changing at least one of the speed or direction of the 3D moving object included in the steerable realistic image content. When the first user changes the speed of the 3D moving object through the input unit 201, the data processing unit 204 may simulate the 3D moving object to match the changed speed, change the playing speed of the realistic image in sync and provide to the first user. When the first user changes the direction of the 3D moving object through the input unit 201, the data processing unit 204 may simulate the 3D moving object in real time to match the changed direction. Additionally, in case that the immersive display device 202 is a head-up display, the data processing unit 204 may track the head of the first user who wears the head-up display, and the head change of the first user may act as the user's input. The data processing unit 204 may recognize the head change and nodding motion of the first user, and in response, may change an area in which the realistic image is provided and simulate the location of the 3D moving object. Additionally, the data processing unit 204 may provide the motion providing device 203 with the coordinates of the 3D moving object that changes in real time in response to the user's input to enable the motion providing device 203 to provide the first user with the motion corresponding to the change of the 3D moving object.

Here, it is necessary to provide at least a 180-degree image with respect to the first user who wears the immersive display device 202 to avoid a blank space in the content when the first user rotates his/her head, thereby providing high level of realism. Accordingly, the realistic image provided by the motion path generation unit 101 is a 360-degree image or a 180-degree image in an image format used to provide a sense of immersion to the first user. The image format may be directly provided in 360-degree images captured by a 360-degree camera or 180-degree images captured by a 180-degree camera, but there is an economic problem with the cost of purchasing the corresponding camera, which places limitations on universality and scalability of the realistic image.

The device 100 for generating realistic image content according to an embodiment of the present disclosure may provide scalability by providing the realistic image using the input FPV image captured through the camera having the ordinary viewing angle (the angle of view of 94°).

FIG. 7 shows the common FPV image captured by the common camera, and the realistic image generation unit 104 may convert the FPV image captured through the camera having the ordinary viewing angle (the angle of view of 94°) to the realistic image through Equirectangular conversion. However, when the viewing angle of the image is not sufficiently wide, it may be impossible to create a 360-degree image that covers the entire visual field of the first user. As shown in FIGS. 8 and 9, when the ordinary FPV image is projected into an equirectangular 360-degree image format (a projection format used to store an image captured at 360-degree viewing angle in an ordinary video format of 2:1 aspect ratio), converted and played on the immersive display device, it can be seen that there is an area that fails to completely cover the normal visual field of the first user. That is, there is a blank spot in the visual field of the first user.

Accordingly, to prevent this problem, the realistic image generation unit 104 may generate the input FPV image into the realistic image corresponding to a 180-degree image, and in the case of the 180-degree image, it is possible to prevent a blank spot in the visual field of the first user. However, to generate the 180-degree image, it is necessary to extend the FPV image and the angle of view, causing degradation of the overall quality of the converted image. The image quality degradation causes visual fatigue to the user when the user experiences the corresponding image, and reduces the realism.

The realistic image generation unit 104 may divide the FPV image into a focused region and a surrounding region, blur the surrounding region, and extend the FPV image to convert it to a 180-degree image. Here, the focused region may be a region in which the moving object is located in the steerable realistic image content, and may be a region at which the user's gaze is mainly directed. Referring to FIGS. 10 and 11, the FPV image is converted into the 180-degree image after blurring the surrounding region, not the focused region. It can be seen that a blank spot is not found in the visual field of the first user, and the focused region has higher image quality than the surrounding region. In general, since humans have more sensitive central vision than peripheral vision, it is possible to prevent the user's visual fatigue and increase the realism by the effects to make the focused region clearer than the surrounding region.

The above-described blurring is not limited to be performed when converting the fixed region and/or image. In another embodiment, the above-described blurring may be performed while playing the image. That is, the realistic image generation unit 104 may extend the FPV image and convert to the 180-degree image to generate the realistic image, synchronize the realistic image with the 3D motion model through the above-described process and provide the same to the data processing unit 204. The realistic image generation unit 104 may blur the surrounding region, not the focused region, in real time in the process of playing the realistic image of the 180-degree image received from the data processing unit 204.

Additionally, as shown in FIG. 12, the data processing unit 204 may receive information associated with the change in the first user's gaze direction (head direction) from the immersive display device 202, and variably change the focused region and the surrounding region based on the information. That is, the focused region at which the user's gaze is directed through head tracking of the first user may be defined in real time, and the realistic image having improved quality and high level of realism may be provided to the first user by blurring the surrounding region, not the focused region.

Hereinafter, a method for generating steerable realistic image content according to another embodiment of the present disclosure will be described.

Figure 13:
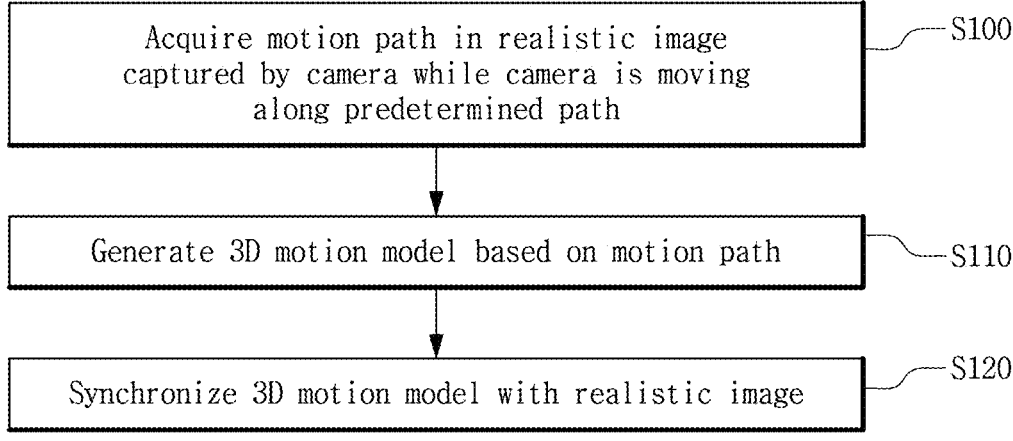
FIG. 13 is a flowchart of a method for generating steerable realistic image content according to another embodiment of the present disclosure.

FIG. 13 is a flowchart of the method for generating steerable realistic image content according to another embodiment of the present disclosure. The method may be performed by the device for generating realistic image content of FIG. 2, and for description of this embodiment, reference may be made to FIGS. 1 to 12.

Referring to FIG. 13, the method for generating steerable realistic image content according to another embodiment of the present disclosure includes acquiring the motion path in the realistic image captured by the camera while the camera is moving along the predetermined path (S100); generating the 3D motion model based on the motion path (S110), wherein the 3D motion model includes the 3D moving object that moves along the 3D motion path generated along the 3D coordinates of the motion path; and synchronizing the 3D motion model with the realistic image (S120).

In an embodiment, the realistic image may include the plurality of images generated frame by frame, the reference point corresponding to the moving object to be modeled in 3D may be defined for each of the plurality of images, and the motion path may be formed by arranging the plurality of images on the 3D space in the playing order and tracking a change in 3D coordinates of the reference point found on the plurality of arranged images.

In an embodiment, the step of synchronizing the 3D motion model with the realistic image may include synchronizing at least the movement speed of the 3D moving object with the playing speed of the realistic image.

In an embodiment, the camera may be a 360-degree camera, and the realistic image may be a 360-degree image.

In an embodiment, the method may further include generating the realistic image by converting the FPV image transmitted from the camera to the realistic image, and the realistic image may be a 180-degree image.

In an embodiment, the step of generating the realistic image by converting the FPV image transmitted from the camera to the realistic image may further include defining the realistic image as the focused region and the surrounding region outside of the focused region, and carrying out blurring to make the surrounding region blurry than the focused region.

The term 'unit' as used in the above embodiments refers to a software or hardware component such as a field programmable gate array (FPGA) or an application specific integrated circuit (ASIC), and the 'unit' plays certain roles. However, the 'unit' is not limited to software or hardware. The 'unit' may be implemented in a storage medium to address and may be implemented to run one or more processors. Accordingly, the 'unit' includes, for example, components such as software components, object-oriented software components, class components and text components, processes, functions, attributes, procedures, subroutines, segments of patent programming code, drivers, firmware, microcode, circuit, data, database, data structures, tables, arrays and variables.

The functions provided in the components and 'units' may be combined into a smaller number of components and 'units' or may be separated from additional components and 'units'.

In addition, the components and 'units' may be implemented to run one or more central processing units (CPUs) in a device or a secure multimedia card.

The method for generating steerable realistic image content according to an embodiment of the present disclosure may be implemented in the form of a computer-readable medium that stores instructions and data that can be executed by the computer. In this instance, the instructions and data may be stored in the form of program code, and when executed by the processor, may generate a predetermined program module and perform a predetermined operation. Additionally, the computer-readable medium may be any available medium that can be accessed by the computer, and includes volatile and nonvolatile media and removable and non removable media. Additionally, the computer-readable medium may be a computer recording medium, and the computer recording medium may include volatile and nonvolatile, removable and non removable media implemented by any method or technique for storing information such as computer-readable instructions, data structures, program modules or other data. For example, the computer recording medium may be a magnetic storage medium such as HDD and SSD, an optical recording medium such as CD, DVD and Blu-ray disc or memory included in a server that is accessible over a network.

Additionally, the method for generating steerable realistic image content according to an embodiment may be implemented into a computer program (or a computer program product) including instructions that can be executed by the computer. The computer program may include programmable machine instructions that are processed by the processor, and may be implemented in high-level programming language, object-oriented programming language, assembly language or machine language. Additionally, the computer program may be recorded in a tangible type of computer-readable recording medium (for example, memory, hard disk, magnetic/optical medium or Solid-State Drive (SSD)).

Accordingly, the method for generating steerable realistic image content according to an embodiment may be implemented by executing the above-described computer program by a computing device. The computing device may include at least some of a processor, memory, a storage device, a high speed interface connected to the memory and a high speed expansion port, and a low speed interface connected to a low speed bus and the storage device. Each of these components may be connected to each other using various buses, and may be mounted on a common motherboard or by any other appropriate method.

Here, the processor may process the instructions in the computing device, and the instructions may include, for example, instructions stored in the memory or the storage device to display graphical information for providing a Graphical User Interface (GUI) on an external input and output device such as a display connected to the high speed interface. In another embodiment, a plurality of processors and/or a plurality of buses may be used with an appropriate number of memory and memory types. Additionally, the processor may be implemented as a chipset including chips including a plurality of independent analogue and/or digital processors.

Additionally, the memory stores information in the computing device. In an example, the memory may include a volatile memory unit or a group thereof. In another example, the memory may include a nonvolatile memory unit or a group thereof. Additionally, the memory may be, for example, another type of computer-readable medium such as magnetic or optical disc.

Additionally, the storage device may provide a large capacity storage space to the computing device. The storage device may be a computer-readable medium or may include the medium, and may include, for example, devices in a Storage Area Network (SAN) or any other configuration, and may be a floppy disc device, a hard disc device, an optical disc device, a tape device, flash memory, another similar semiconductor memory device or device array.

The above-described embodiments are provided by way of illustration, and those having ordinary skill in the technical field pertaining to the above-described embodiments will understand that the above-described embodiments may be easily modified in any other specific form without changing the technical spirit or essential features of the above-described embodiments. Therefore, it should be understood that the above-described embodiments are exemplary only and are not restrictive in all aspects. For example, each component described in a singular form may work in a distributed manner, and likewise, the distributed components described herein may work in combination.

The scope of protection sought for the present disclosure is defined by the following appended claims rather than the above-described detailed description, and should be interpreted as including all changes or modifications derived from the meaning and scope of the appended claims and the equivalent concept thereof.

DETAILED DESCRIPTION OF MAIN ELEMENTS

10: System for generating realistic image content
100: Device for generating realistic image content
200: Device for providing realistic image content
What is claimed is:

1. A device for generating steerable realistic image content, comprising:
at least one processor; and
a memory configured to store at least one program which is executed by the at least one processor,
wherein the processor is configured to:
acquire a motion path in a realistic image captured by a camera while the camera is moving along a predetermined path, wherein the motion path is extracted from the realistic image using Visual Simultaneous Localization And Mapping (SLAM), and is generated reflecting geographic information system (GIS) information of a location at which the realistic image is captured,
generate a 3-dimensional (3D) motion model based on the motion path, and
synchronize the 3D motion model with the realistic image to generate synchronization information,
wherein the 3D motion model includes a 3D moving object which moves along a 3D motion path generated along 3D coordinates of the motion path, wherein the 3D motion path is formed by a movement of a cylindrical model along the 3D coordinates of the motion path in a sequential order and a movement of the 3D moving object is modeled reflecting physical features applied to the 3D moving object as the 3D moving object moves along the motion path, wherein a change in direction of the 3D moving object is limited to a range of the realistic image,
wherein the realistic image includes a plurality of images generated frame by frame, and a reference point corresponding to the moving object to be modeled in 3D is defined for each of the plurality of images,
wherein the motion path is generated by arranging the plurality of images on a 3D space in a playing order, and tracking a change in 3D coordinates of the reference point found on the plurality of arranged images,
wherein the movement of the 3D moving object and the plurality of images for each frame is matched with respect to a plurality of key frames defined at a predetermined interval between a start frame and an end frame of the plurality of images, wherein the processor is configured to determine a location at which the 3D motion model displayed with the realistic image is displayed on a display, wherein the location corresponds to the reference point of the realistic image,
wherein the processor is configured to synchronize at least a movement speed of the 3D moving object with a playing speed of the realistic image, and
wherein the movement speed of the 3D moving object changes in response to a change in the playing speed of the realistic image, and the playing speed of the realistic image changes in response to a change in the movement speed of the 3D moving object caused by a first user's manipulation.

2. The device for generating steerable realistic image content according to claim 1, wherein the camera is a 360-degree camera, and the realistic image is a 360-degree image.

3. The device for generating steerable realistic image content according to claim 1, wherein the processor is further configured to convert a first-person view (FPV) image transmitted from the camera to the realistic image, and the realistic image is a 180-degree image.

4. The device for generating steerable realistic image content according to claim 3, wherein the realistic image is defined as a focused region and a surrounding region outside of the focused region, and
wherein the processor is further configured to carry out blurring to make the surrounding region blurry than the focused region.

5. A motion simulation system of steerable realistic image content, comprising:
a device for generating realistic image content to generate the steerable realistic image content; and
a device for providing a realistic image to provide the steerable realistic image content to a first user,
wherein the device for generating realistic image content includes at least one first processor and a first memory to store at least one program which is executed by the at least one first processor,
wherein the first processor is configured to: acquire a motion path in a realistic image captured by a camera while the camera is moving along a predetermined path, wherein the motion path is extracted from the realistic image using Visual Simultaneous Localization And Mapping (SLAM), and is generated reflecting geographic information system (GIS) information of a location at which the realistic image is captured, generate a 3-dimensional (3D) motion model based on the motion path, and synchronize the 3D motion model with the realistic image to generate synchronization information,
wherein the 3D motion model includes a 3D moving object which moves a 3D motion path generated along 3D coordinates of the motion path,
wherein the 3D motion path is formed by a movement of a cylindrical model along the 3D coordinates of the motion path in a sequential order,
wherein a movement of the 3D moving object is modeled reflecting physical features applied to the 3D moving object as the 3D moving object moves along the motion path,
wherein a change in direction of the 3D moving object is limited to a range of the realistic image,
wherein the steerable realistic image content includes the realistic image, the 3D motion model and the synchronization information, wherein the device for providing a realistic image includes:

at least one second processor and a second memory to store at least one program which is executed by the at least one second processor, wherein the second processor is configured to input the first user's steering command, at least one third processor and a third memory to store at least one program which is executed by the at least one third processor, wherein the third processor is configured to output the steerable realistic image content to the first user, at least one fourth processor and a fourth memory to store at least one program which is executed by the at least one fourth processor, wherein the fourth processor is configured to transmit a motion change in the steerable realistic image content to the first user, and a fifth processor configured to control the second processor, the third processor and the fourth processor, wherein the movement of the 3D moving object and the plurality of images for each frame is matched with respect to a plurality of key frames defined at a predetermined interval between a start frame and an end frame of the plurality of images, wherein the first processor is configured to determine a location at which the 3D motion model displayed with the realistic image is displayed on a display, wherein the location corresponds to the reference point of the realistic image, wherein the fifth processor is configured to provide the realistic image to the first user through the third processor, and provide the steerable realistic image content to the first user by simulating the 3D motion model corresponding to the realistic image with reference to the synchronization information, wherein the fifth processor is configured to perform processing to reflect the first user's input provided by the second processor on the steerable realistic image content in real time, wherein when the first user changes a speed of the 3D moving object through the second processor, the fifth processor is configured to simulate the 3D moving object to match the changed speed, change the playing speed of the realistic image in sync and provide to the first user, and wherein the fifth processor is configured to change the movement speed of the 3D moving object in response to a change in the playing speed of the realistic image, and to change the playing speed of the realistic image in response to a change in the movement speed of the 3D moving object caused by a first user's manipulation.

6. The motion simulation system of steerable realistic image content according to claim 5, wherein the first processor is further configured to convert a first-person view (FPV) image transmitted from the camera to the realistic image, and the realistic image is a 180-degree image.

7. The motion simulation system of steerable realistic image content according to claim 6, wherein the realistic image is defined as a focused region and a surrounding region outside of the focused region, and wherein the fifth processor is further configured to receive information associated with a change in head direction of the first user from the third processor, define the focused region and the surrounding region in real time based on the received information associated with the change in head direction and blur the defined surrounding region.

8. A method for generating steerable realistic image content, performed by a device for generating steerable realistic image content, including at least one processor and a memory for storing a program which is executed by the processor, the method comprising:

acquiring a motion path in a realistic image captured by a camera while the camera is moving along a predetermined path, wherein the motion path is extracted from the realistic image using Visual Simultaneous Localization And Mapping (SLAM), and is generated reflecting geographic information system (GIS) information of a location at which the realistic image is captured;

generating a 3-dimensional (3D) motion model based on the motion path, wherein the 3D motion model includes a 3D moving object which moves along a 3D motion path generated along 3D coordinates of the motion path, wherein the 3D motion path is formed by a movement of a cylindrical model along the 3D coordinates of the motion path in a sequential order; and synchronizing the 3D motion model with the realistic image, wherein a movement of the 3D moving object is modeled reflecting physical features applied to the 3D moving object as the 3D moving object moves along the motion path, wherein a change in direction of the 3D moving object is limited to a range of the realistic image, wherein the realistic image includes a plurality of images generated frame by frame, and a reference point corresponding to the moving object to be modeled in 3D is defined for each of the plurality of images, wherein the motion path is generated by arranging the plurality of images on a 3D space in a playing order, and tracking a change in 3D coordinates of the reference point found on the plurality of arranged images, wherein synchronizing the 3D motion model with the realistic image comprises synchronizing at least a movement speed of the 3D moving object with a playing speed of the realistic image, wherein the movement of the 3D moving object and the plurality of images for each frame is matched with respect to a plurality of key frames defined at a predetermined interval between a start frame and an end frame of the plurality of images, wherein the synchronizing includes determining a location at which the 3D motion model displayed with the realistic image is displayed on a display, wherein the location corresponds to the reference point of the realistic image, and wherein the movement speed of the 3D moving object changes in response to a change in the playing speed of the realistic image, and the playing speed of the realistic image changes in response to a change in the movement speed of the 3D moving object caused by a first user's manipulation.

9. The method for generating steerable realistic image content according to claim 8, wherein the camera is a 360-degree camera, and the realistic image is a 360-degree image.

10. The method for generating steerable realistic image content according to claim 8, further comprising:

generating the realistic image by converting a first-person view (FPV) image transmitted from the camera to the realistic image, wherein the realistic image is a 180-degree image.

11. The method for generating steerable realistic image content according to claim 10, wherein generating the realistic image by converting the FPV image transmitted from the camera to the realistic image further comprises:

defining the realistic image as a focused region and a surrounding region outside of the focused region; and carrying out blurring to make the surrounding region more blurry than the focused region.

12. A non-transitory computer-readable medium for storing a computer program which is executed to perform the method for generating steerable realistic image content according to claim 8.

\* \* \* \* \*